(12) United States Patent
Kohada et al.

(10) Patent No.: US 8,031,567 B2
(45) Date of Patent: Oct. 4, 2011

(54) DATA RECORDING METHOD AND DATA RECORDING DEVICE FOR WRITE-ONCE TYPE RECORDING MEDIUM

(75) Inventors: Tetsuhiro Kohada, Osaka (JP); Katsumi Akagi, Osaka (JP)

(73) Assignee: Panasonic Corporation, Osaka (JP)

( * ) Notice: Subject to any disclaimer, the term of this patent is extended or adjusted under 35 U.S.C. 154(b) by 365 days.

(21) Appl. No.: 12/295,950

(22) PCT Filed: Apr. 2, 2007

(86) PCT No.: PCT/JP2007/057392
§ 371 (c)(1),
(2), (4) Date: Jan. 9, 2009

(87) PCT Pub. No.: WO2007/114424
PCT Pub. Date: Oct. 11, 2007

(65) Prior Publication Data
US 2010/0157754 A1 Jun. 24, 2010

(30) Foreign Application Priority Data
Apr. 6, 2006 (JP) .................................. 2006-104837

(51) Int. Cl.
*G11B 7/00* (2006.01)
(52) U.S. Cl. .................. 369/47.15; 369/47.13
(58) Field of Classification Search ........................ None
See application file for complete search history.

(56) References Cited

U.S. PATENT DOCUMENTS

| 5,617,393 | A | 4/1997 | Itami et al. | |
|---|---|---|---|---|
| 2004/0213117 | A1 | 10/2004 | Sasaki | |
| 2008/0212431 | A1 | 9/2008 | Nakamura | |
| 2008/0232210 | A1* | 9/2008 | Buban et al. ............... | 369/47.13 |
| 2009/0122671 | A1* | 5/2009 | Park ........................... | 369/47.15 |
| 2009/0129221 | A1* | 5/2009 | Park ........................... | 369/47.15 |

FOREIGN PATENT DOCUMENTS

| EP | 1 471 533 | 10/2004 |
|---|---|---|
| JP | 5-266594 | 10/1993 |

(Continued)

OTHER PUBLICATIONS

International Search Report issued May 1, 2007 in the International (PCT) Application No. PCT/JP2007/057392.

(Continued)

*Primary Examiner* — Van Chow
(74) *Attorney, Agent, or Firm* — Wenderoth, Lind & Ponack, L.L.P.

(57) ABSTRACT

In a data recording method for a write-once type recording medium capable of pseudo overwrite, it is judged whether data to be recorded in the write-once type recording medium exists. If it is judged that data exists, it is judged that the data is to be recorded from the next writable address (NWA) indicating the boundary between a recorded area and non-recorded area. If it is judged that the data is to be recorded from the next writable address, the data is recorded from the next writable address; and if it is judged that the data is not to be recorded from the next writable address, recording of the data is suspended. While data to be recorded exists, the aforementioned steps are repeated. If no data to be recorded exists, the data whose recording has been suspended is recorded.

5 Claims, 8 Drawing Sheets

FOREIGN PATENT DOCUMENTS

| | | |
|---|---|---|
| JP | 9-259575 | 10/1997 |
| JP | 2002-238015 | 8/2002 |
| JP | 2004-326917 | 11/2004 |
| JP | 2005-196903 | 7/2005 |
| WO | 2005/124767 | 12/2005 |

OTHER PUBLICATIONS

Universal Disk Format Specification (Revision 2.60) 2005, chapter 152, 6.16.3.

International Preliminary Report on Patentability issued Nov. 27, 2008 in International (PCT) Application No. PCT/JP2007/057392.

\* cited by examiner

PRIOR ART

DATA RECORDING METHOD AND DATA RECORDING DEVICE FOR WRITE-ONCE TYPE RECORDING MEDIUM

TECHNICAL FIELD

The present invention relates to a data recording method and a data recording device for a write-once type recording medium which is, especially a write-once type recording medium capable of pseudo overwrite.

BACKGROUND ART

Figure 4A:
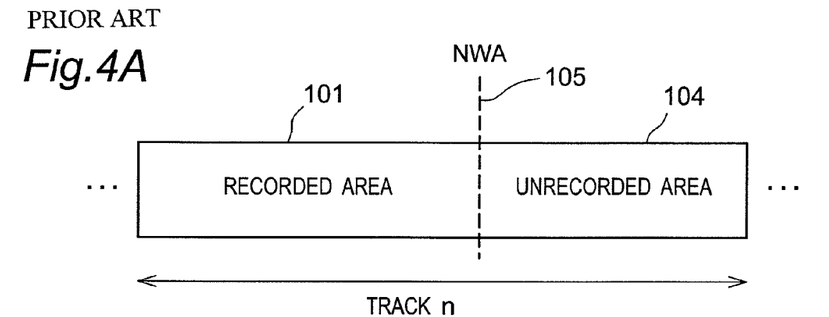
FIG. 4 is an explanatory view for pseudo overwrite in a conventional write-once type recording medium.

According to a conventional write-once type recording medium such as a DVD-R, an entire recording area can be written only once physically. In other words, according to a write-once type recording medium, as shown in FIG. 4A, new data can be recorded only in a area starting from a NWA (Next Writable Address) 105 provided at a boundary between a recorded area 101 and an unrecorded area 104, and data recorded in the data-recorded area before the address of the NWA cannot be overwritten physically.

However, recently, a method capable of pseudo-overwriting of data in the recorded area of the write-once type recording medium has been developed. For example, a write-once type recording medium such as a BD-R (Blu-ray Disc Recordable Format) can be provided with a replacement management area while keeping the same characteristics as that of the conventional write-once type recording medium. In addition, a record/reproduction device (disk drive and the like) for a write-once type recording medium can perform a replacement process to such a write-once type recording medium. Thus, the replacement process enables recording (overwrite) of data to the recorded area, which is impossible for the conventional write-once type recording medium (refer to Non-Patent Document 1, for example). Such overwrite is referred to as the "pseudo overwrite" hereinafter.

Figure 4B:
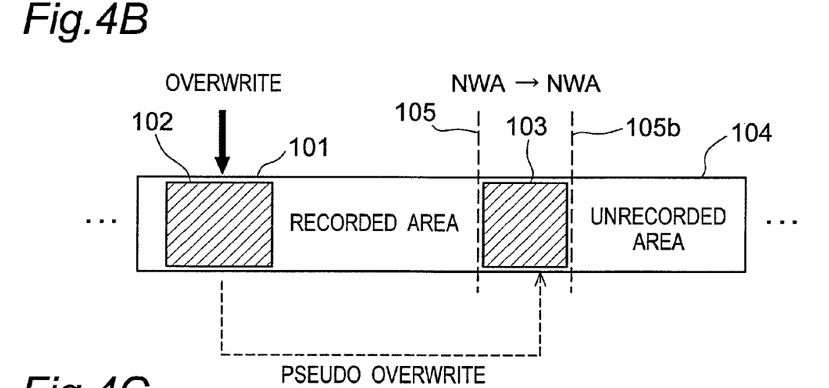

With reference to FIG. 4B, the pseudo overwrite will be described. When data is overwritten in a partial area 102 of a recorded area 101, the data to be overwritten is recorded in an unrecorded area 103 starting from the NWA 105. Then, replacement information showing that the area 102 is replaced with the area 103 is recorded in a replacement management area in the recording medium. As a result of the replacement process replacing the area 102 with the area 103, a NWA 105*b* is newly set after the area 103. Note that management data is recorded in anywhere in the recording medium similar to user data.

This method allows pseudo overwrite of data to be achieved in the recorded area of the write-once type recording medium. However, since the pseudo overwrite is accompanied with the replacement process, the replacement information relating the areas to each other is generated. The replacement information is recorded in the write-once type recording medium, consuming the recording area. Thus the replacement process cannot be performed infinitely. That is, the number of times of the pseudo overwrite processes is limited in the write-once type recording medium. In addition, when the user data is overwritten in the above BD-R, it is necessary to record the user data in the area 103 in the unrecorded area 104 shown in FIG. 4B, and record the management data already recorded in the recorded area 101 and including an updated address of the user data recorded in the area 103 (refer to Patent Document 1, for example).

Patent Document 1: JP 09-259575 A
Non-Patent Document 1: Universal Disk Format Specification (Revision 2.60) 2005, chapter 152, 6.16.3

DISCLOSURE OF INVENTION

Problems to be Solved by the Invention

Figure 4C:
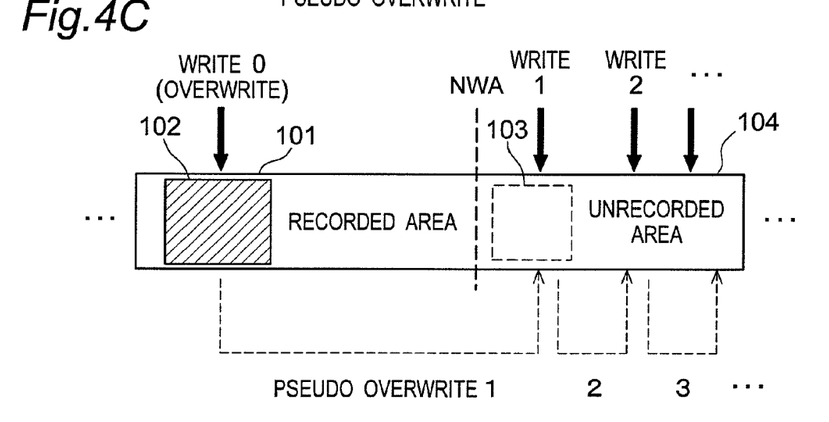

It is assumed that there are a plurality of record (write) requests (write 0, 1, 2, ...), as shown in FIG. 4C. Write 0 for a recorded area before the NWA is pseudo overwrite, and thus the data is recorded in the area 103 starting from the NWA (replacement process). Thus, a new NWA is set at the end of the area 103, and as a result, pseudo overwrite is also provided to Write 1 which is originally recording data to the unrecorded area. Similarly, pseudo overwrite is also provided to Write 2. Hence, the problem occurs, in that the pseudo overwrite continuously occurs (pseudo overwrite 1, 2, ...). Such continuous pseudo overwrites rapidly consume the replacement management area in which the replacement information is recorded, causing the problem that the pseudo overwrite cannot be performed eventually. That is, the problem is that the pseudo overwrite cannot be performed even when there is a free space in the data recording area of the recording medium.

The present invention is made to solve the above problems and it is an object of the present invention to provide a recording method and a recording device capable of efficiently recording data by reducing a frequency of the pseudo overwrite when recording data in a write-once type recording medium capable of pseudo overwrite.

Means for Solving the Problems

According to a first aspect of the present invention, a data recording method for recording data in a write-once type recording medium capable of pseudo overwrite is provided. The data recording method includes the following steps:

a step of determining whether there is data to be recorded in the write-once type recording medium or not;

a step of determining whether or not the data is to be recorded from a next writable address showing a boundary between a recorded area and an unrecorded area, when it is determined that there is the data to be recorded in the write-once type recording medium;

a step of recording the data from the next writable address, when it is determined that the data is to be recorded from the next writable address;

a step of suspending the recording of the data, when it is determined that the data is not to be recorded from the next writable address;

a step of repeating the above steps while there is the data to be recorded in the write-once type recording medium; and a step of recording the suspended data, when it is determined that there is no data to be recorded in the write-once type recording medium.

The data recording method may further include the following steps:

a step of determining a type of the data to be recorded, when it is determined that the data is not to be recorded from the next writable address; and a step of recording the data to be recorded, from the next writable address when the type of the data to be recorded is a user data, and updating management data containing rearrangement information relating an address specified for the data to be recorded, to an address of the user data actually written.

According to a second aspect of the present invention, a data recording device recording data in a write-once type recording medium capable of pseudo overwrite is provided. The data recording device includes a drive operable to record data in the write-once type recording medium and capable of performing pseudo overwrite, and a controller operable to control the drive. The controller determines whether there is data to be recorded in the write-once type recording medium or not; determines whether or not the data is to be recorded from a next writable address showing a boundary between a recorded area and an unrecorded area, when it is determined that there is the data to be recorded in the write-once type recording medium; sends, to the drive, write request for recording the data from the next writable address, when it is determined that the data is to be recorded from the next writable address; suspends the recording of the data, when it is determined that the data is not to be recorded from the next writable address; repeats the above steps while there is the data to be recorded in the write-once type recording medium; and sends, to the drive, write request for recording the suspended data, when it is determined that there is no data to be recorded in the write-once type recording medium.

According to another aspect of the present invention, a program is provided which makes a computer to execute the above recording method. The program can be stored in a computer readable recording medium.

Effects of the Invention

According to the present invention, the recording order of the data is controlled so that the data can be recorded with pseudo overwrite restricted when recording the data to a write-once type recording medium capable of pseudo overwrite, resulting in efficiently recording of the data. Consequently, the present invention enables efficient usage of the recording area in the recording medium.

REFERENCE SINGS

1 Information processing device
8 Disc drive
9 Buffer
10 Controller
11 File system controller
15 Hard disc drive (data storage unit)
17 Operation unit
19 Display controller
21 Interface
101 Recorded area
102 Recorded area (by pseudo overwrite)
103 Area in which new data is recorded by pseudo overwrite
104 Unrecorded area
105, 105b NWA (Next Writable Address) 200
200 Write-once type recording medium

BEST MODE FOR CARRYING OUT THE INVENTION

With reference to the accompanying drawings, best mode for carrying out the present invention is described below.

Figure 1:
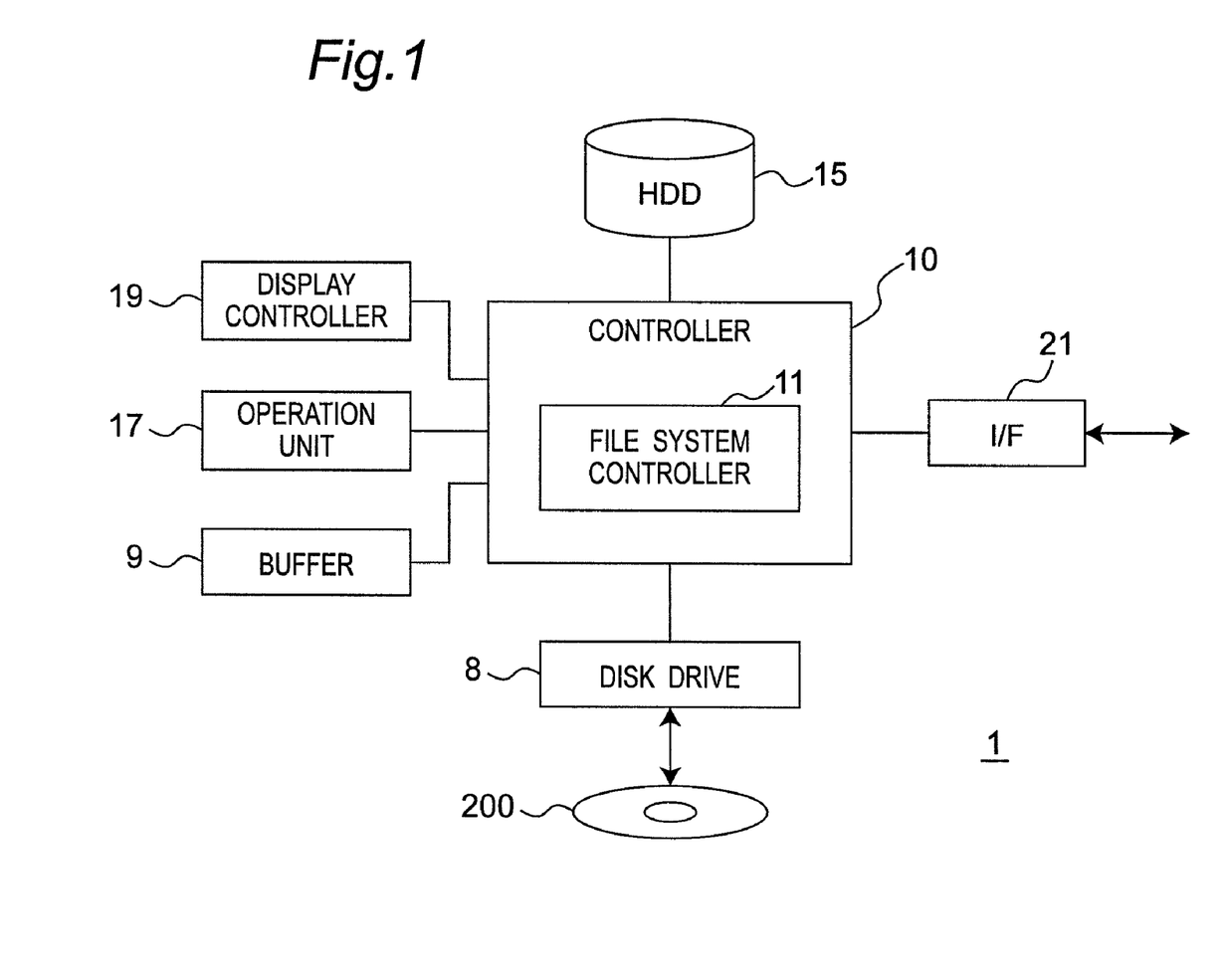
FIG. 1 is a view showing a configuration of an information processing device according to an embodiment of the present invention.

FIG. 1 is a view showing a configuration of one embodiment of an information processing device according to the present invention.

An information processing device 1 has a disc drive 8 for recording data in a recording medium 200 and reading data from the recording medium 200, a buffer 9 for temporarily storing the data to be recorded in the recording medium 200, a controller 10 for controlling an operation of the whole information processing device, a hard disc drive (HDD) 15 for storing a program executed by the controller 10, data and the like, an operation unit 17 including such as a key board and a mouse for inputting operation information of a user, a display controller 19 for controlling a display operation of a display device such as a liquid crystal display, and an interface 21 for exchanging data with an external device or a network. The controller 10 includes a file system controller 11. The controller 10 includes a CPU, MPU or the like, and executes a predetermined program to provide the below described function of the file system controller 11, and the like.

The file system controller 11 controls reading and writing data from and to the recording medium 200. According to this embodiment, the file system controller 11 controls the reading and writing operation according to a universal disc format (UDF). When writing data to the recording medium 200, the file system controller 11 sends a write request to the disc drive 8 with specified address and data.

Upon receipt of the write request from the file system controller 11, the disc drive 8 records the data in the address specified by the recording medium 200. The recording medium 200 is a write-once type recording medium which is capable of pseudo overwrite, such as BD-R. The disc drive 8 can process pseudo overwrite. When the file system controller 11 requests the data recording to a recorded area of the recording medium 200, the disc drive 8 performs pseudo overwrite to the recording medium 200 with a replacement process.

The information processing device 1 is a computer capable of multi-task process, and can execute a plurality of processes at the same time. Each process requests data writing to the recording medium 200, as needed. The write requests are stored in the buffer 9. The file system controller 11 instructs the recording medium 200 to write data according to the write request stored in the buffer 9. When the recording medium 200 is a write-once type recording medium, the file system controller 11 manages a NWA (Next Writable Address) which is an address showing a boundary between a recorded area and unrecorded area in the recording medium 200.

According to this embodiment, the file system controller 11 manages a timing and an address in the data recording process of the recording medium 200 so as to reduce frequency of the pseudo overwrite by the disc drive 8.

With reference to FIGS. 2 and 3A to 3E, a recording operation of the file system controller 11 is described below.

Figure 2:
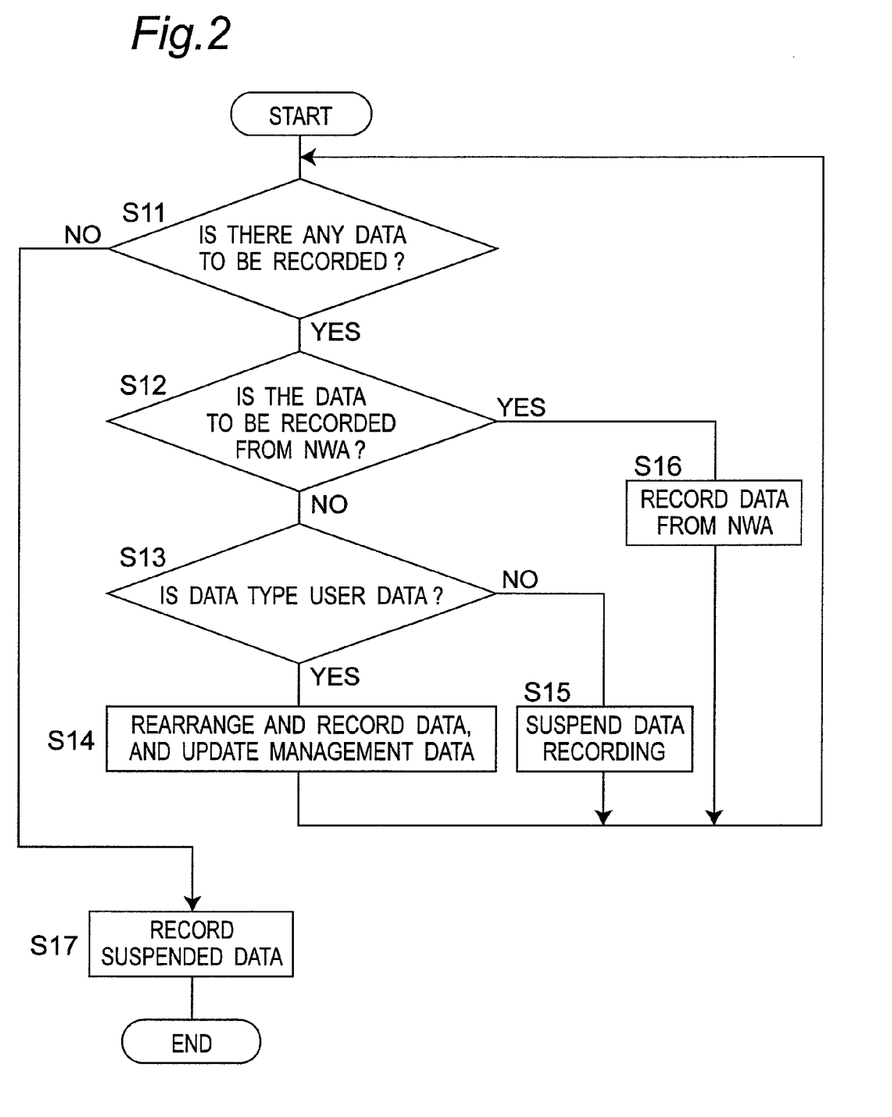
FIG. 2 is a flowchart of a data recording process of the information processing device (file system controller) according to the embodiment of the present invention.

FIG. 2 is a flowchart of the recording operation in the recording medium 200 by the file system controller 11 of the information processing device 1 according to the present embodiment. In addition, FIGS. 3A to 3E are explanatory views for data recording and rearrangement by the file system controller 11.

Referring to FIG. 2, first, the file system controller 11 determines whether or not there is data to be recorded to the recording medium 200 (S11), in the buffer 9. The data to be recorded is generated by each process as needed and stored temporarily to the buffer 9. When a part of recorded data is overwritten, an address showing a position to be overwritten is specified in the process.

Figure 3A:
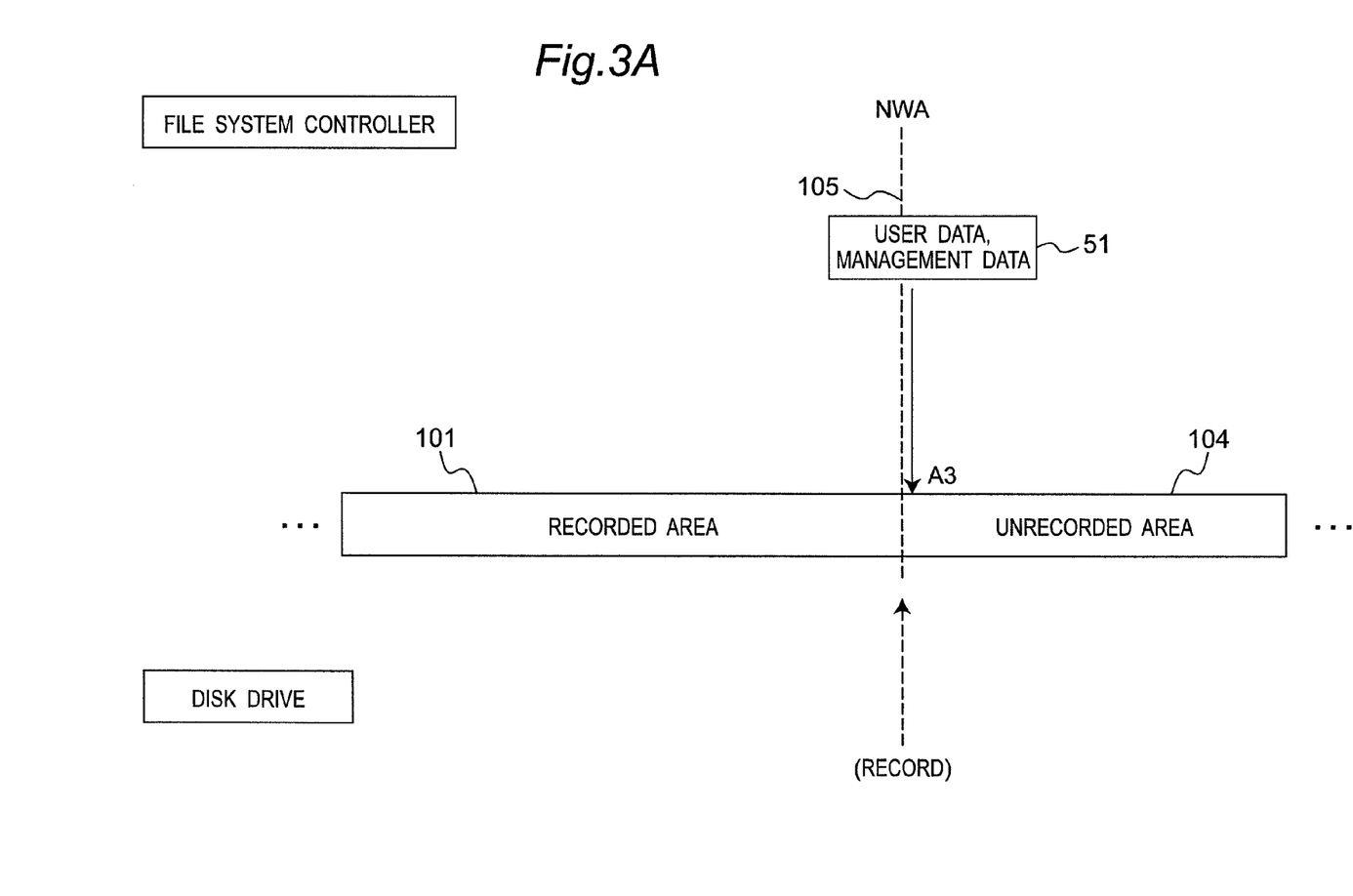
FIG. 3A is an explanatory view for data recording by the file system controller.

When there is data to be recorded, it is determined whether the data is to be recorded from the NWA or not (S12). In other words, in step S12, it is determined whether the data to be recorded is the data to be recorded in the unrecorded area (area starting from the NWA) or not. When the data to be recorded is the data to be recorded from the NWA, that is, when the data is recorded in the unrecorded area, the file system controller 11 sends the write request to the disc drive 8 so that the data is recorded from the NWA (S16). For example, as shown in FIG. 3A, in the case where the data (user data or management data) 51 is to be recorded from an address A3 (that is, NWA) as a starting address of the unrecorded area, the file system controller 11 transmits the write request to the disc drive 8 with the specified address so that the data 51 is recorded from the address A3. The disc drive 8 records the data 51 from the address A3 in response to the write request.

Meanwhile, when it is determined that the data to be recorded is not the data to be recorded from the NWA in step S12, that is, when the data is to be recorded to the recorded area (overwrite is designated), a type of the data to be recorded is determined (S13).

When the type of the data to be recorded is "user data", a position in which the data is to be recorded is rearranged in the unrecorded area, and then the data is recorded therein and management data regarding the rearrangement is updated (S14). Here, the management data refers to information for managing the user data, such as information on a data recording position in the file system. It is an ICB (Information Control Block) in a UDF, for example. The management data is managed by the file system controller 11. Although the management data is not recorded in the recording medium 200 but only held in the information processing device 1 in step S14, it is then recorded in the recording medium 200 at a predetermined timing (for example, in step S17) finally.

Figure 3B:
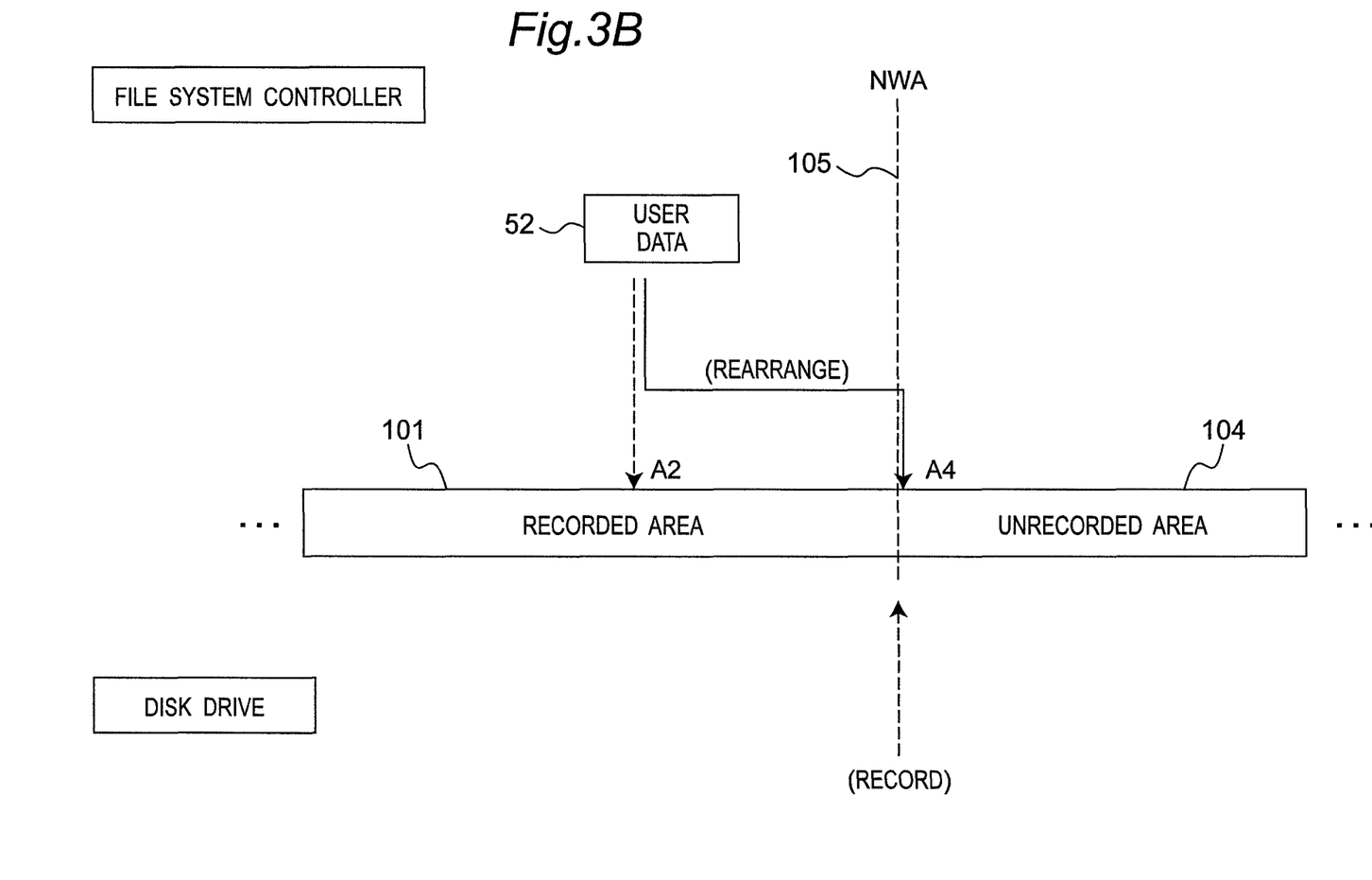
FIG. 3B is an explanatory view for data rearrangement by the file system controller.
Figure 3C:
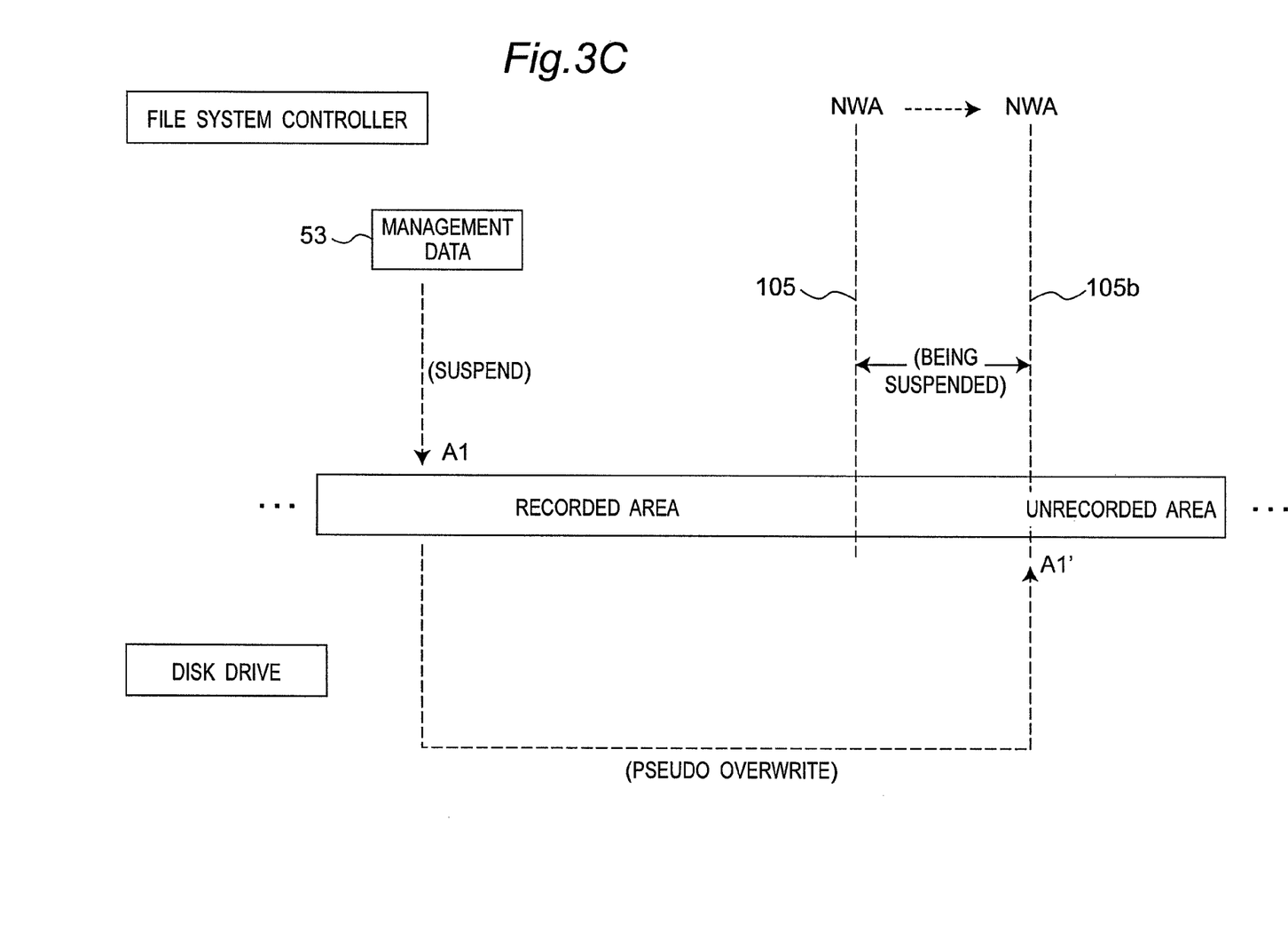
FIG. 3C is an explanatory view for data suspension and data recording by the file system controller.

Recording of user data 52 shown in FIG. 3B corresponds to the above example. The user data 52 is specified to be recorded from an address A2 before the NWA. In this case, the file system controller 11 rearranges the user data 52 at an address A4 as a starting address of the unrecorded area (that is, the NWA) and then transmits the write request to the disc drive 8. That is, the file system controller 11 specifies the address so that the user data 52 is recorded from the address A4 and transmits the write request to the disc drive 8. The disc drive 8 records the user data 52 from the address A4 of the recording medium 200 in response to this write request. Furthermore, the file system controller 11 updates the management data such that the management data includes rearrangement information showing that the recording location of the user data 52 is rearranged from the address A2 to the address A4. When reading the rearranged user data 52 form the recording medium 200 later, the file system controller 11 can recognize the relation between the address A2 and the address A4 with reference to the rearrangement information, so that the user data 52 can be read from the recording medium 200.

As described above, when the user data is recorded in the recorded area of the recording medium 200 (when overwrite is designated), the file system controller 11 rearranges the data in the unrecorded area and then makes the write request to the disc drive 8. Thus, the disc drive 200 determines that the data is to be recorded in the unrecorded area and does not perform the pseudo overwrite. As a result, the frequency of the pseudo overwrites can be reduced.

In step S13, when it is determined that the type of the data to be recorded is not the "user data", that is, when it is determined that the data is the "management data", recording of the data is suspended (S15). That is, the management data is not recorded at that time. The recording of management data 53 shown in FIG. 3C corresponds to the above case. The management data 53 is to be recorded from an address A1 which is positioned before the NWA 105. The file system controller 11 does not send write request of the management data 53 to the disc drive 8, suspending temporarily the write request. While the write request is suspended, the information of the write request is removed from the buffer 9 and held in the other recording area (other buffer). Thus, the file system controller 11 reads the write request from the other recording area (other buffer) later, and writes the suspended data.

Thus, the file system controller 11 performs various writing processes based on the write address or the type of the data. When there is no data to be recorded, in the buffer 9 (No in step S11), the file system controller 11 transmits the write request of the suspended data to the disc drive 8 (S17). The disc drive 8 writes the data in the recording medium 200 in response to the write request from the file system controller 11. Since other data in the buffer 9 is recorded while the management data 53 is suspended, the NWA 105 moves to a NWA 105b when the management data 53 is recorded actually. In this case, since the specified address A1 is positioned before the NWA 105b, the disc drive 8 performs the pseudo overwrite. For example, referring to FIG. 3C, the disc drive 8 performs the replacement process in which the data 53 to be written in the address A1 originally is written in an address A1'. At this time, the disc drive 8 records its replacement information.

As described above, when the writing of management data in the area (recorded area) before the NWA is requested, the recording of the data is temporarily suspended. Then, after the writing of the data to be recorded in the area after the NWA (unrecorded area) is all completed, the suspended data is written. Thus, the pseudo overwrite is prevented from being performed continuously as described in the section of "Background Art", and the frequency of the pseudo overwrite can be reduced.

Figure 3D:
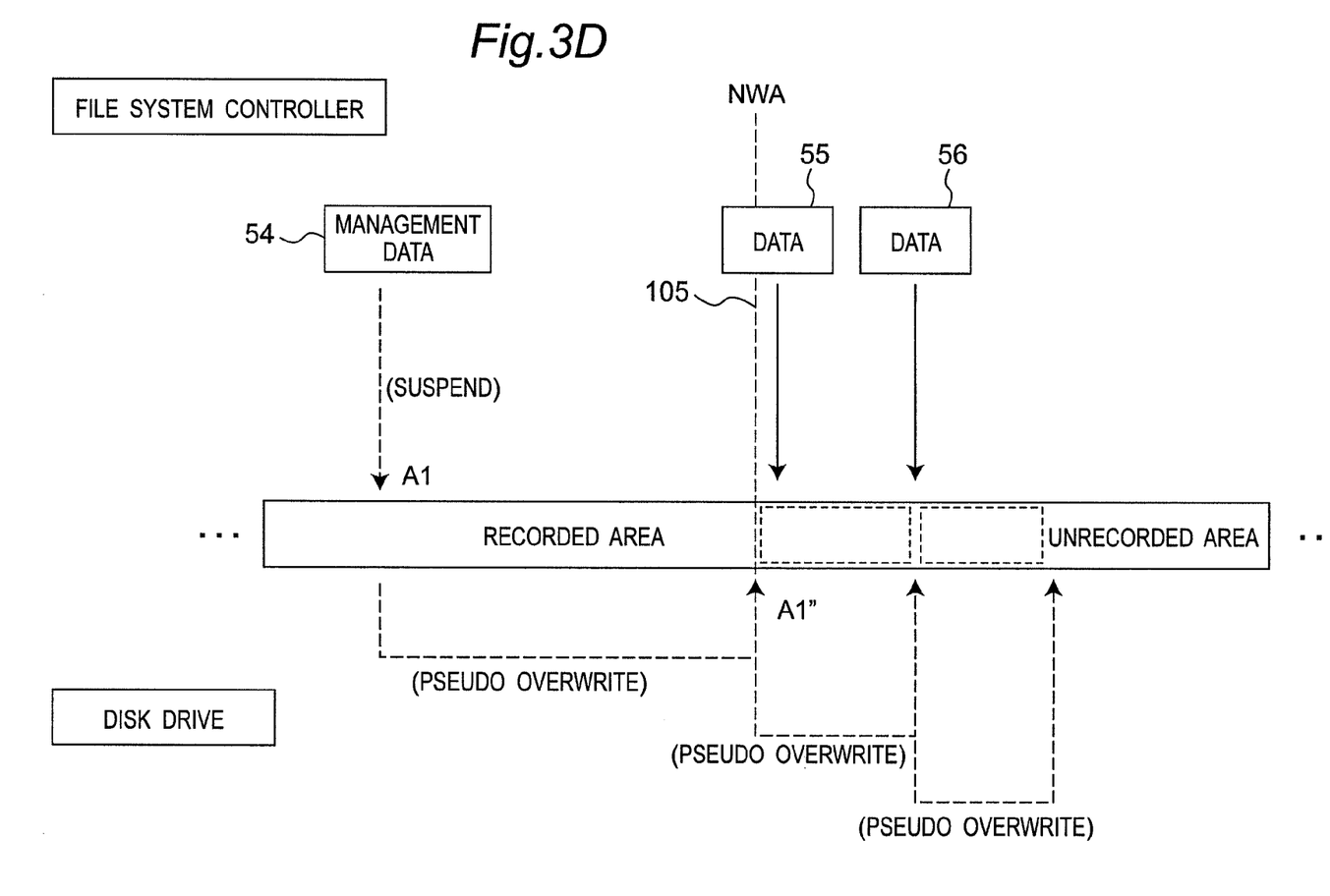
FIG. 3D is an explanatory view for continuous pseudo overwrite which occurs in a conventional data recording process.
Figure 3E:
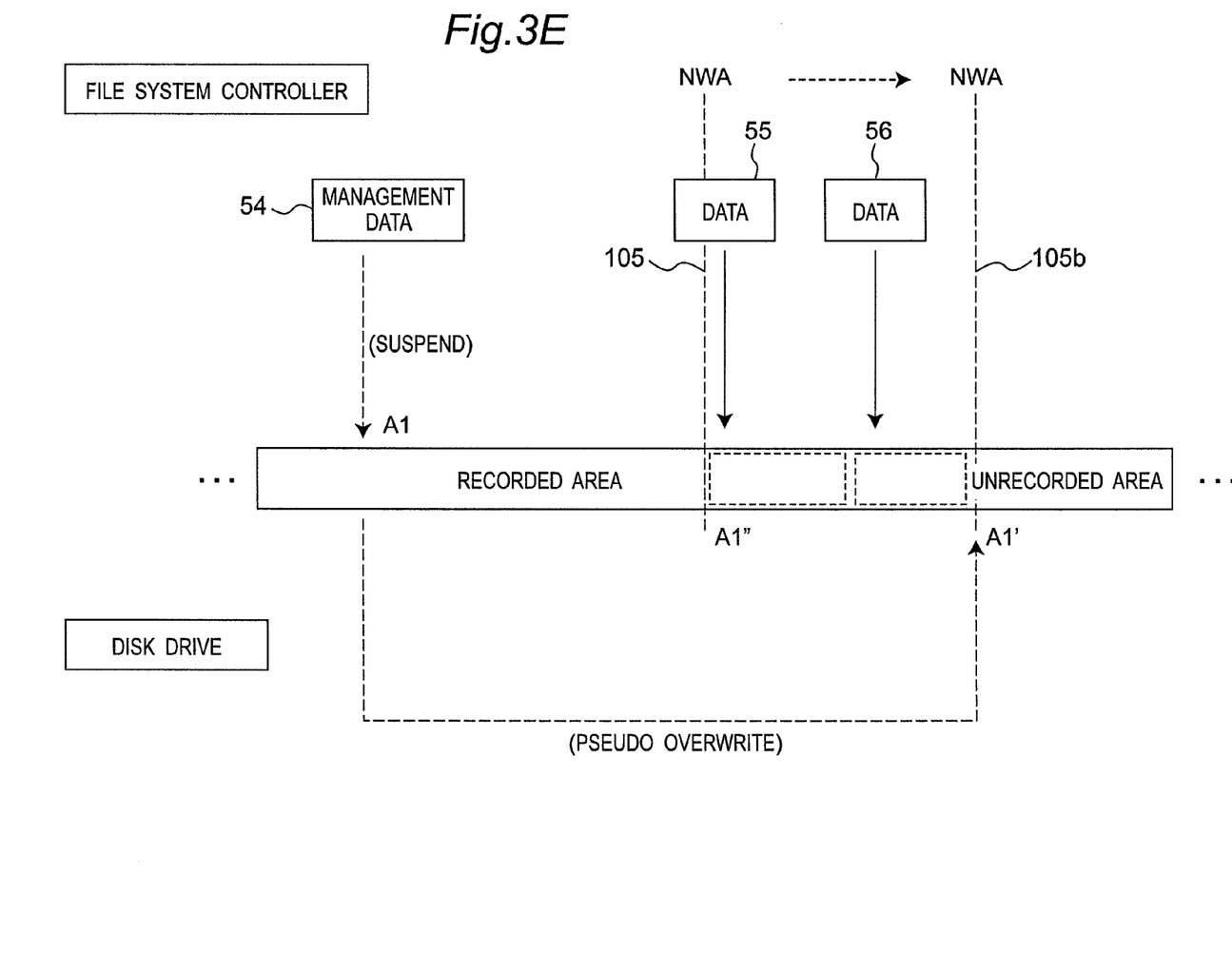
FIG. 3E is an explanatory view for data arrangement in data recording (pseudo overwrite) by the file system controller.

For example, as shown in FIG. 3D, it is assumed that write requests for management data 54, data 55 and data 56 are stored in the buffer 9 in this order. According to the conventional method, the management data 54 is not suspended but written immediately. That is, the management data 54 is pseudo-overwritten from an address A1" by the disc drive 8. Thus, the NWA 105 is moved and the data 55 and 56 are also continuously pseudo-overwritten. Meanwhile, according to this embodiment, as shown in FIG. 3E, the recording of the management data 54 is temporarily suspended and after the recording of the data 55 and 56, it is recorded (pseudo-overwritten). Thus, the pseudo overwrite is performed finally, and thus chain of the continuous pseudo overwrites can be prevented as shown in FIG. 3D.

Note that, in this embodiment, when the management data is possibly pseudo-overwritten, the recording of the management data is suspended. However, the recording of the user data when it being possibly pseudo-overwritten may be temporarily suspended and recorded later similar to the management data.

In addition, the write request from each process is temporarily stored in the buffer 9 once, in this embodiment. However it may be directly transmitted to the file system controller 11. In this case, it may be configured in step S11 to determine that there is no data to be recorded when the write request is not transmitted from the process for a predetermined period of time.

In this embodiment, the concept of present invention is applied to the information processing device. However it is understood that the concept of the present invention may be applied to a recording device (for example, a record/reproduction device of an optical disc) for recording data to a write-once type recording medium capable of pseudo overwrite.

INDUSTRIAL APPLICABILITY

According to the present invention, when data is recorded in a write-once type recording medium capable of pseudo overwrite, the recording order of the data is controlled to record the data while restricting the pseudo overwrite, so that the data can be efficiently recorded. That is, the recording area of the recording medium can be efficiently used, and thus the present invention can be advantageously applied to a management method of a file system area.

The invention claimed is:

1. A data recording method for recording data in a write-once type recording medium capable of pseudo overwrite, comprising:
   determining whether there is data to be recorded in the write-once type recording medium or not;
   determining whether or not the data is to be recorded from a next writable address showing a boundary between a recorded area and an unrecorded area, when it is determined that there is the data to be recorded in the write-once type recording medium;
   recording the data from the next writable address, when it is determined that the data is to be recorded from the next writable address;
   suspending the recording of the data, when it is determined that the data is not to be recorded from the next writable address;
   repeating the above steps while there is the data to be recorded in the write-once type recording medium; and
   recording the suspended data, when it is determined that there is no data to be recorded in the write-once type recording medium.

2. The data recording method according to claim 1, further comprising:
   determining a type of the data to be recorded, when it is determined that the data is not to be recorded from the next writable address; and
   recording the data to be recorded, from the next writable address when the type of the data to be recorded is a user data, and updating management data containing rearrangement information relating an address specified for the data to be recorded, to an address of the user data actually written.

3. A data recording device recording data in a write-once type recording medium capable of pseudo overwrite, comprising:
   a drive operable to record data in the write-once type recording medium and capable of performing pseudo overwrite; and
   a controller operable to control the drive, wherein the controller
      determines whether there is data to be recorded in the write-once type recording medium or not;
      determines whether or not the data is to be recorded from a next writable address showing a boundary between a recorded area and an unrecorded area, when it is determined that there is the data to be recorded in the write-once type recording medium;
      sends, to the drive, write request for recording the data from the next writable address, when it is determined that the data is to be recorded from the next writable address;
      suspends the recording of the data, when it is determined that the data is not to be recorded from the next writable address;
      repeats the above steps while there is the data to be recorded in the write-once type recording medium; and
      sends, to the drive, write request for recording the suspended data, when it is determined that there is no data to be recorded in the write-once type recording medium.

4. The data recording device according to claim 3, wherein the controller determines a type of the data to be recorded, when it is determined that the data is not to be recorded from the next writable address; and
   controls the drive to record the data to be recorded, from the next writable address when the type of the data to be recorded is a user data, and
   updates management data containing rearrangement information relating an address specified for the data to be recorded, to an address of the user data actually written.

5. A non-transitory computer-readable recording medium having stored thereon a program for making a computer execute each step of the method according to claim 1.

* * * * *